US008010365B1

(12) United States Patent  
Collins et al.

(10) Patent No.: US 8,010,365 B1
(45) Date of Patent: Aug. 30, 2011

(54) METHOD AND SYSTEM FOR INTEGRATING AN INTERACTIVE VOICE RESPONSE SYSTEM INTO A HOST APPLICATION SYSTEM

(75) Inventors: Dean Collins, Manchester, CT (US); Kathleen D'Auria, Manchester, CT (US); Raul Matamoros, Simsbury, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 12/729,043

(22) Filed: Mar. 22, 2010

Related U.S. Application Data

(63) Continuation of application No. 10/412,269, filed on Apr. 14, 2003, now Pat. No. 7,684,989.

(51) Int. Cl.
    *G10L 21/00* (2006.01)
(52) U.S. Cl. ............... 704/270.1; 704/270; 704/275; 378/88
(58) Field of Classification Search ............... 704/270.1, 704/270, 275; 378/88
    See application file for complete search history.

(56) References Cited

U.S. PATENT DOCUMENTS

| 6,366,658 | B1 * | 4/2002 | Bjornberg et al. | 379/221.08 |
|---|---|---|---|---|
| 6,389,126 | B1 * | 5/2002 | Bjornberg et al. | 379/201.03 |
| 6,604,075 | B1 | 8/2003 | Brown et al. | |
| 6,999,930 | B1 | 2/2006 | Roberts et al. | |
| 2001/0024497 | A1 * | 9/2001 | Campbell et al. | 379/265.09 |
| 2002/0035474 | A1 * | 3/2002 | Alpdemir | 704/270 |
| 2003/0088421 | A1 * | 5/2003 | Maes et al. | 704/270.1 |
| 2004/0128139 | A1 * | 7/2004 | Ilan et al. | 704/275 |
| 2004/0205614 | A1 | 10/2004 | Keswa | |

* cited by examiner

*Primary Examiner* — Qi Han
(74) *Attorney, Agent, or Firm* — Stroock & Stroock & Lavan LLP (57) ABSTRACT

The present invention relates particularly to a method and system for integrating an interactive voice response (IVR) environment into an existing host processing system to provide automated telephone responses to callers to the host system. The integrated IVR environment is highly scaleable with hardware and software open to the host system for in-house modification and/or addition of components and applications to accommodate additional and/or modified host business logic, host applications, and other host requirements. The integrated IVR environment also alleviates the high cost often associated with the purchase, installation, and maintenance of the IVR functionality for a host processing system.

14 Claims, 5 Drawing Sheets

(PRIOR ART)

METHOD AND SYSTEM FOR INTEGRATING AN INTERACTIVE VOICE RESPONSE SYSTEM INTO A HOST APPLICATION SYSTEM

PRIORITY

This application is a continuation of U.S. patent application Ser. No. 10/412,269, filed Apr. 14, 2003, to issue as U.S. Pat. No. 7,684,989 on Mar. 23, 2010, which is incorporated herein by reference in its entirety.

BACKGROUND OF THE INVENTION

1. Field of the Invention

The present invention relates to the field of voice application infrastructure. More particularly, the present invention relates to a system and method for integrating voice applications into a host application system and running the voice applications within the host application system.

2. Background

To reduce cost overheads, organizations have been encouraging automated access to their support systems through utilities such as telephone automation, private data networks, and the Internet. For instance, many organizations seek to reduce the costly staffing of customer service call centers by using telephone automation such as interactive voice response (IVR) systems. As known in the art, an IVR system refers to an automated voice communication system having one or more voice response units (VRUs) which provide callers with voice applications for IVR, a functionality that provides one or more fixed voice menus of options and automatic voice response to callers based upon selections by callers and how each VRU is configured. A caller can correspond with an IVR system by pressing digits on the phone number keypad or speaking designated words or short phrases into the phone. Hence, a host organization can maintain an IVR system to provide callers with needed information 24 hours a day, 7 days a week, without the need to maintain more costly around-the-clock call service centers staffed with agents.

Figure 1:
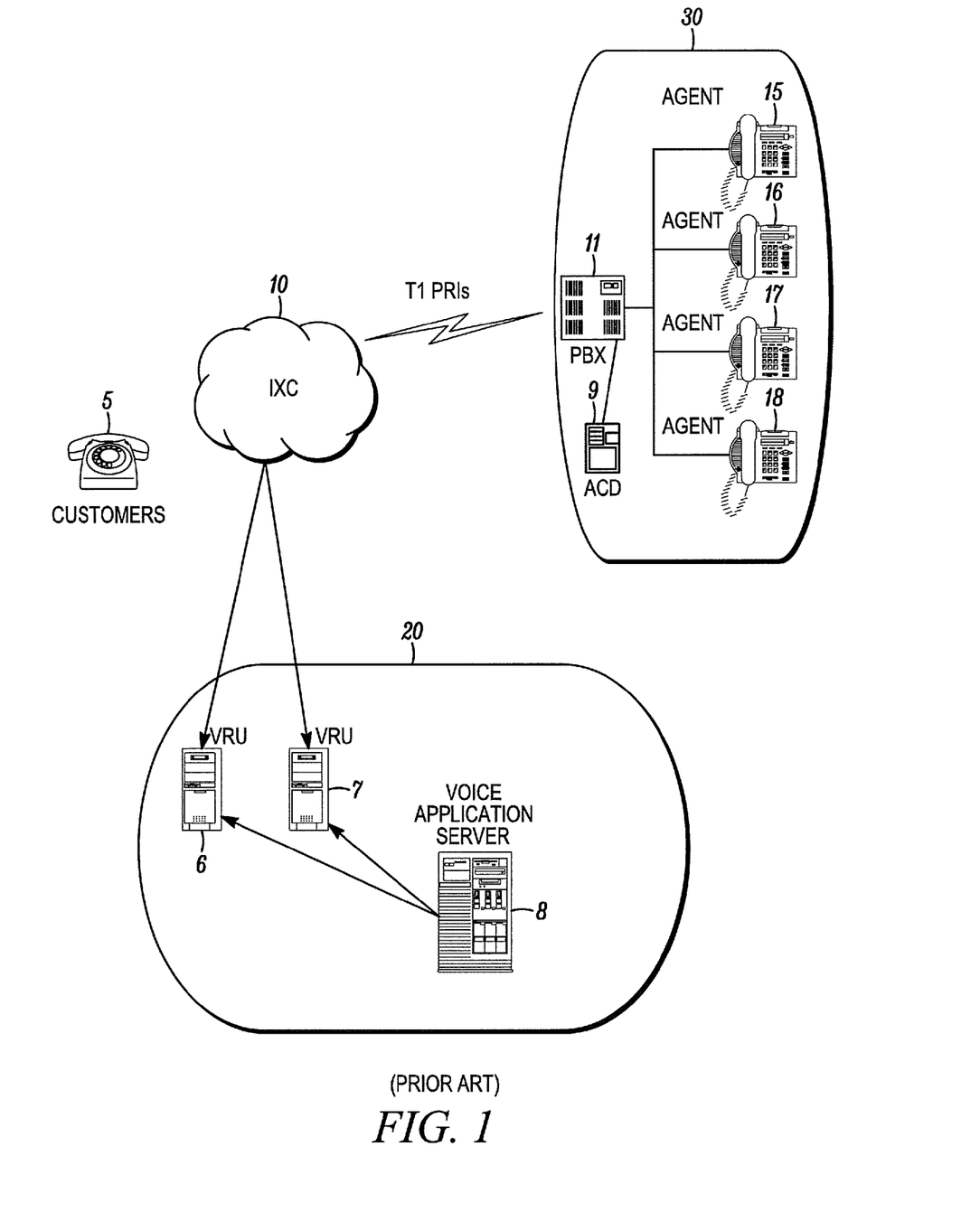
FIG. 1 depicts a conventional IVR system set-up.

FIG. 1 depicts a conventional IVR system set-up. As shown in the figure, the IVR functionality sits on a stand-alone platform 20 with proprietary hardware and software for creating, maintaining, and accessing voice applications. For instance, the IVR platform 20 can include a voice application server 8 for maintaining voice applications once they are created and VRUs 6 and 7 for accessing such applications as needed to service callers. In operation, the stand-alone IVR platform 20 can be accessed by a communication carrier 10, which routes incoming calls to the stand-alone IVR system for automated voice communication with the VRUs. When a caller wishes to connect to an agent or customer service representative (CSRs) of the host organization, the VRU 6 or 7 will signal a private branch exchange (PBX) 11 at a designated call service center 30 to switch the call to an automated call distribution server (ACD) 9. The call can be transferred to the ACD 9 via the communication carrier 10 or via a dedicated communication trunk between the stand-alone IVR platform 20 and call service center 30. The ACD 9, is selected by the enterprise's intelligent call router (ICR) (not shown), such as Cisco intelligent contact management (ICMs), which is running a script to choose between multiple possible target ACDs. The ACD then connects the caller to an available agent (15-18 on diagram) for personal voice communication. There are numerous providers that offer stand-alone IVR systems, such as, Telera Inc. (recently acquired by Alcatel), Avaya, Callogistix of CMR, Inc., Database Systems Corp., and IVR Inc. The communication carrier can be an interexchange carrier (IXC) (e.g., Qwest, AT&T, MCI Worldcom, Sprint) or a local exchange carrier (LEC) (e.g., the baby Bells).

SUMMARY OF THE INVENTION

One of the problems with a conventional stand-alone IVR system is that it merely presents a vertical "black box" solution to the host organization and system. In other words, a host organization wishing to have IVR functionality to handle incoming phone calls for its system must purchase the complete solution in the form of a stand-alone IVR system with proprietary hardware and software configurations. For instance, the stand-alone IVR system may include proprietary VRUs and their proprietary voice applications. As a proprietary vendor platform, the stand-alone IVR system would have its own coding environment and language for creating and running its VRU applications. As a result, applications in the stand-alone IVR system are not portable, special training is needed to operate such system, and integration of the host system's intelligent call routing devices to the stand-alone IVR system must be outsourced to the vendor. Hence, the host organization loses control of its system configuration to external vendor(s), who may not be aware of emerging business needs of the host organization and utilize all the necessary functions to meet such needs. Additionally, existing host business logic and other host requirements must be rewritten to be utilized because the proprietary nature of the stand-alone IVR system requires most logic to run on the same hardware that physically handles the call. Because the VRU applications are complicated by such proprietary infrastructure baggage, they are difficult and costly to maintain, create, and integrate into an existing host system.

Another problem with the stand-alone IVR system is the requirement to purchase extra hardware and software licenses in order to expand the system in anticipation of future needs. Because this is an expensive way to accomplish over-provisioning needs, excess system capacity does not exist, and the entire IVR system must be purchased ahead of time with tight purchasing decisions that leave no room for expansion. As a consequence, the stand-alone IVR system cannot be readily modified to support future host requirements and new technologies, such as a transition from a time division multiplexing (TDM) platform to a voice-over-IP (VoIP) platform. This also precludes running small pilots, and innovation is dampened.

Still another problem with the stand-alone IVR system is the resulting dependence of the overall enterprise (i.e., the host system together with the stand-alone IVR system) on the IXC or LEC for the telephony solution. This is because routing plans and features such as network promptings are often provided by such carriers. Consequently, changing carriers can be extremely difficult and/or costly, the enterprise's negotiating leverage with the carrier is lost, and network prompting by the carrier may not be compatible with VRU applications in the stand-alone IVR system.

Thus, there exists a need for a method and system to seamlessly integrate an IVR environment into a host system that are free from at least some of the aforementioned problems.

Accordingly, the preferred embodiments of the present invention provide a method and system for integrating an IVR environment into a host system to provide telephone automation to callers to the host organization.

The preferred embodiments of the present invention also provide a method and system for developing voice user interfaces (UIs) to existing applications running on host application servers to ease the integration and maintenance of the IVR solution within the host system.

The preferred embodiments of the present invention further provide a method and system for deploying and maintaining a highly scaleable IVR environment in-house at the host system with IVR hardware and software open to the host organization for modification and/or addition of components and applications to accommodate additional and/or modified host business logic and other host requirements.

The preferred embodiments of the present invention also provide a method and system for deploying and maintaining an IVR environment in-house at the host system such that users wishing to access the host system can do so via telephone automation in addition to other access means, such as Internet access with a web browser.

The preferred embodiments of the present invention also provide a method and system for providing an IVR solution on a standard platform that is integrated with the host system to reduce high cost often associated with the purchase, installation, and maintenance of a stand-alone IVR system.

The preferred embodiments of the present invention also provide a method and system for integrating an IVR environment into a host system to provide users with access to the host system via an automated voice browser, wherein they can opt out of the voice browser for desired human interaction with call service centers maintained by the host organization and managed by its host system.

The preferred embodiments of the present invention also provide a method and system for enabling voice communication with host applications, wherein the host business logic and other host requirements are separated from the voice UI in order to allow the host applications to be used with other means of communication.

Additional aspects and novel features of the invention will be set forth in part in the description that follows, and in part will become more apparent to those skilled in the art upon examination of the present disclosure.

BRIEF DESCRIPTION OF THE DRAWINGS

The preferred embodiments of the present invention are illustrated by way of example and not limited to the following figures and appendices, in which.

DETAILED DESCRIPTION OF THE INVENTION

Reference is now made in detail to the preferred embodiments of the present invention, illustrative examples of which are illustrated in the accompanying drawings, showing a method and system for a host system having an integrated interactive voice response (IVR) environment.

According to one embodiment of the present invention, from the end-user's perspective, calling into a host system having an integrated IVR environment is no different than calling into a host system equipped with a stand-alone IVR system running through a carrier's network. In other words, the integrated IVR environment of the present invention remains an automated, menu-driven platform that can answer questions from callers, fulfill their inquiries, complete their transactions, track their order status, etc., depending on the desired use of the integrated IVR environment. Hence, the integrated IVR environment of the present invention may be provided with both the automatic number identification (ANI) of the caller (e.g., caller-ID) and the dialed number identification (DNI) from the carrier (e.g., IXC or LEC). It can offer the caller voice menu choices and options for various different services, direct the caller to the appropriate resource(s) for the chosen services, and provide the caller with access to self-service applications in certain situations. For example, upon calling a support phone number (e.g., an 800 number) designated by the host organization, such as Travelers Property Casualty Company (hereinafter, "Travelers"), the caller may be greeted with a typical welcoming voice message over the phone. At this point, the IVR-integrated host system is provided with the ANI and DNI of the caller, and it uses the ANI to check with one or more host databases in an attempt to identify the caller. The host databases can be contact routing databases that maintains data on all customers that have transacted with the host organization.

Next, the caller may hear a recorded message asking he/she to self identify. At the request, the caller can reply using the telephone keypad or speaking into the phone the caller's account number, name, social security number, home phone number, or any other means of identification desired by the host organization. Dual-Tone Multi-Frequency (DTMF) translation and speech recognition provided by the integrated IVR environment are employed to understand the caller's inputs. If the host system cannot identify the caller from the retrieved ANI or such information is not available, the request for self-identification from the caller gives the host system another opportunity to search its databases in a second attempt to identify the caller and retrieve the caller's relevant information. If the host system can identify the caller from the retrieved ANI, the request for self-identification from the caller can serve to further match the caller against a smaller pool of records that have been retrieved based on the ANI. For instance, if both the husband and wife in the same household have accounts with the host organization, and only one person calls up the host system, the retrieved ANI is limited to identifying that it is someone from the calling household. Thus, the self-identification request serves to further identify the caller from the smaller pool of records, namely, the husband and wife at that household phone number. As known in the art, caller identification and retrieval of caller information from the host databases allow the host organization to customize responses for each caller and enhance the caller's experience in dealing with the host organization. This, in turn, enhances the caller's loyalty toward the host organization and its overall reputation. In the case of an insurance company, such as Travelers, the customers can be, for example, the claimants, insurers, and/or insurance agents. The self-identification request can also serve to verify the caller for security purposes.

As mentioned earlier, the phone number that the caller dialed to access the host system can be identified from the DNI provided by the carrier. This is important when the host system has provided multiple phone numbers for callers to access the host system 100 for different services. Depending on the number that the caller used, the caller can get different greeting messages and access to various different services from the host system, as predetermined by the host organization. For instance, if the caller dials a designated claims service number to reach Travelers, the caller may be greeted with a voice message, "Thank you for calling Travelers Claims Department" and presented with a voice menu having a myriad of options for servicing or providing information on a particular insurance claim. Likewise, if the caller dials a designated insurance rates service number to reach Travelers, the caller may be greeted with a voice message, "Thank you for calling Travelers Rate Quote Services" and presented with a voice menu having a myriad of rate service options for providing the caller with rate quotes on desired insurance plans. However, if the caller dials a more general number to reach Travelers, the caller may be greeted with a more generic voice message, "Thank you for calling Travelers" and presented with a higher-level voice menu with options to select a particular insurance service, such as claims service or rates service, wherein the caller is next presented with the voice menu for each respective service as described earlier. Depending on the choices selected by the caller at the various levels of voice menus and options, the caller can then be routed to different resources in the host organization and system, such as a foreign-language speaking counselor to accommodate the caller's language need or preference, a customer service representative (CSR) in a host call center, or one or more self-service applications retrievable through the integrated IVR environment. As mentioned earlier, the integrated IVR environment is equally applicable as an automated, menu-driven platform for other uses. It can also utilize speech recognition systems to flatten the menus, providing a simpler prompting interface.

From the system's perspective, the integration of an IVR environment into a host system is at least structurally different from the proprietary platform of a conventional stand-alone IVR system. Because the integrated IVR environment of the present invention can utilize existing server platforms and applications of the host system, it frees the host from any restraints often associated with the proprietary hardware and software often found in the stand-alone IVR system. The integrated IVR environment can assimilate and interface more readily with existing host system platforms, such as browser-based web page platforms or platforms for other types of user access, wherein voice applications can run on the same host server(s) and use the same methodology as other host applications. Hence, a host organization can integrate the IVR environment of the present invention into its existing system with minimal modification to the existing system environment and without requiring the assistance of an IVR system vendor/provider or a communication carrier. This reduces the high support cost associated with the typical stand-alone IVR system and eases the maintenance and integration of IVR applications with existing host applications.

According to an embodiment of the present invention, the integrated IVR environment is also a highly scalable infrastructure, wherein existing applications in the host system can be expanded and/or additional ones can be created to accommodate additional business logic and/or other host requirements. While the combined hardware-software infrastructure of the integrated IVR environment remains the same, additional ports and components may be appended as needed to the environment to accommodate the expansion and/or addition of applications.

Figure 2:
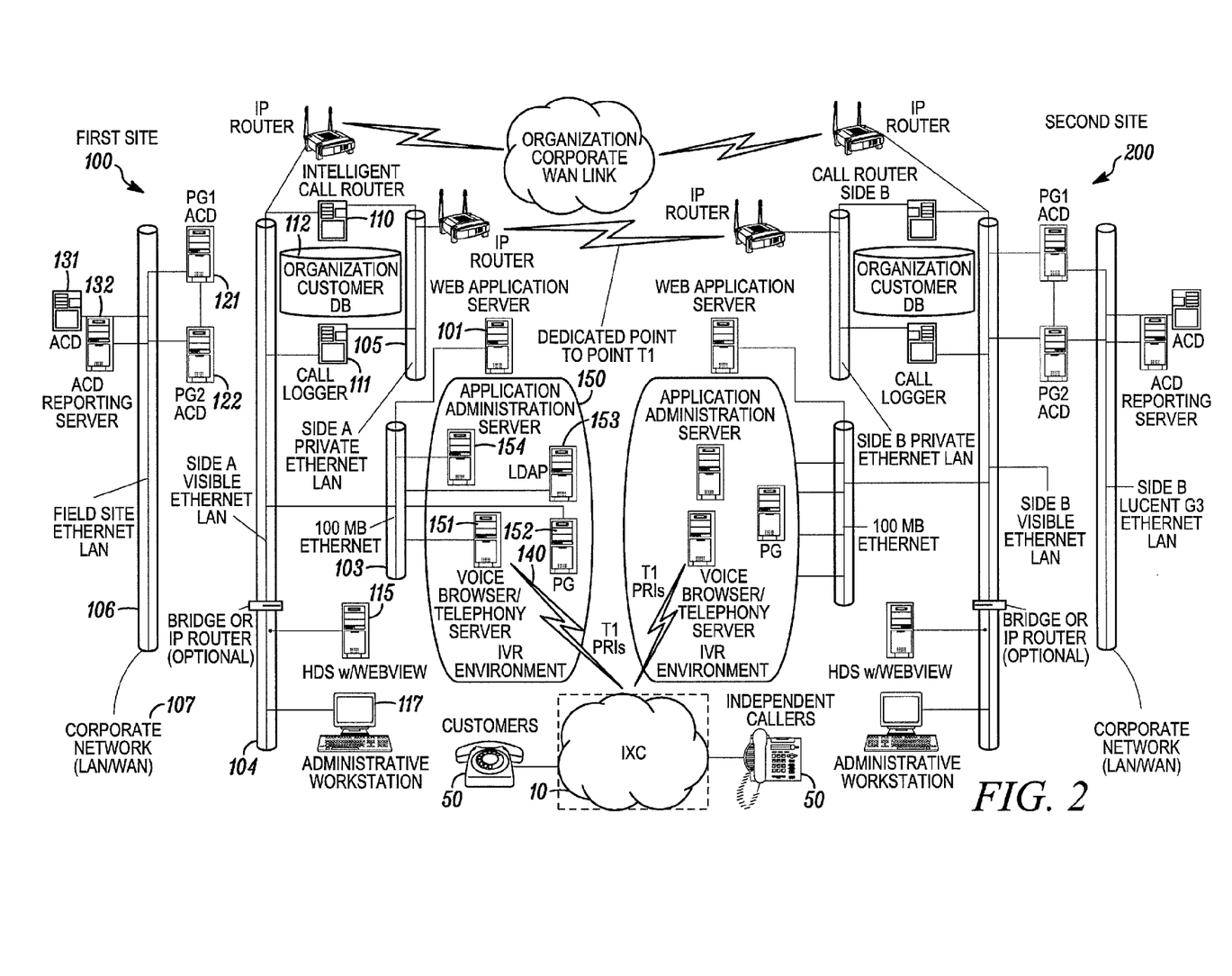
FIG. 2 depicts a host system with an integrated interactive voice response (IVR) environment in accordance with an embodiment of the present invention.

An IVR-integrated host system is now described with reference to FIG. 2, in accordance with one embodiment of the present invention. FIG. 2 shows that a host organization can have two identical sites for servicing callers, a first site having a host system 100 and a second site having an identical host system 200. One site can act as the primary site, and the other one acts a secondary or back-up site in fail-over situations. In other words, if the primary site goes down, callers can be directed to the secondary site. Alternatively, both sites can be primary sites, wherein each is used to service callers from a different geographical location to ease or avoid call congestion at the host system. A carrier such as the IXC 10 can be used to route the callers to the respective site accordingly. As shown in the figure, private communication networks such as Wide Area Networks (WANs) and Internet Protocol (IP) routers with dedicated point-to-point T1 lines can be used for communication between the sites to ensure that they remain identical to one another in terms of data contained therein. Because the sites have substantially the same host system networks, only the host system 100 is described hereinafter with the understanding that the same description applies to the host system 200 as well.

According to one embodiment of the present invention, there is an IVR environment integrated within the host system 100, which together form a single enterprise infrastructure maintained by the host organization. The IVR environment 150 may include one or more VRUs with DTMF translation and voice/speech recognition functionalities to provide callers with a voice browser to navigate the host system. It acts as a voice user interface (UI) between the callers and existing application server(s) at the host system to provide the callers with telephone access to applications in the host application server(s). For instance, the host system 100 may have one or more existing web application servers (WAS) 101 for servicing Internet access, and the IVR environment 150 allows a user to access applications in the WAS 101 with a telephone in lieu of or in addition to a web browser on a computer or another electronic device. The voice browser is analogous to an Internet web browser in that a caller can browse and navigate through different menus and choices available from the host system to obtain desired information using voice and/or touch-tone communication with the host system. Thus, instead of sending content in the form of text and images to the user, as done by a web browser, the voice browser provides voice strings or recorded messages to the user, who is now a caller. And instead of providing different links that a user can click on to browse and navigate through the host system, the voice browser provides the caller with different voice menus and options from which to choose. Hence, the integrated environment 150 acts as a translator between the caller and the WAS 101, which contains the business logic and requirements and application contents, for voice communication with the caller.

For purposes of the above example, the IVR-integrated host system 100 can provide voice access of existing host applications without the need to redesign the WAS 101 or create new server(s) with rewritten/recoded web applications and business logic to accommodate telephone/voice access. In other words, the host system's business logic and other host applications as maintained in the WAS 101 are separated from the voice user interface (UI) and its logic, and components in the IVR environment 150 that physically handle the call do not run the business logic and web applications. Hence, users can continue to access host applications in the WAS 101 with a web browser and the usual web access infrastructure (not shown FIG. 2) that is connected to the WAS 101, which acts as the intersection point for both web and voice accesses. It should be noted that the host applications can be stored in locations other than the WAS 101 within the host system.

Figure 3A:
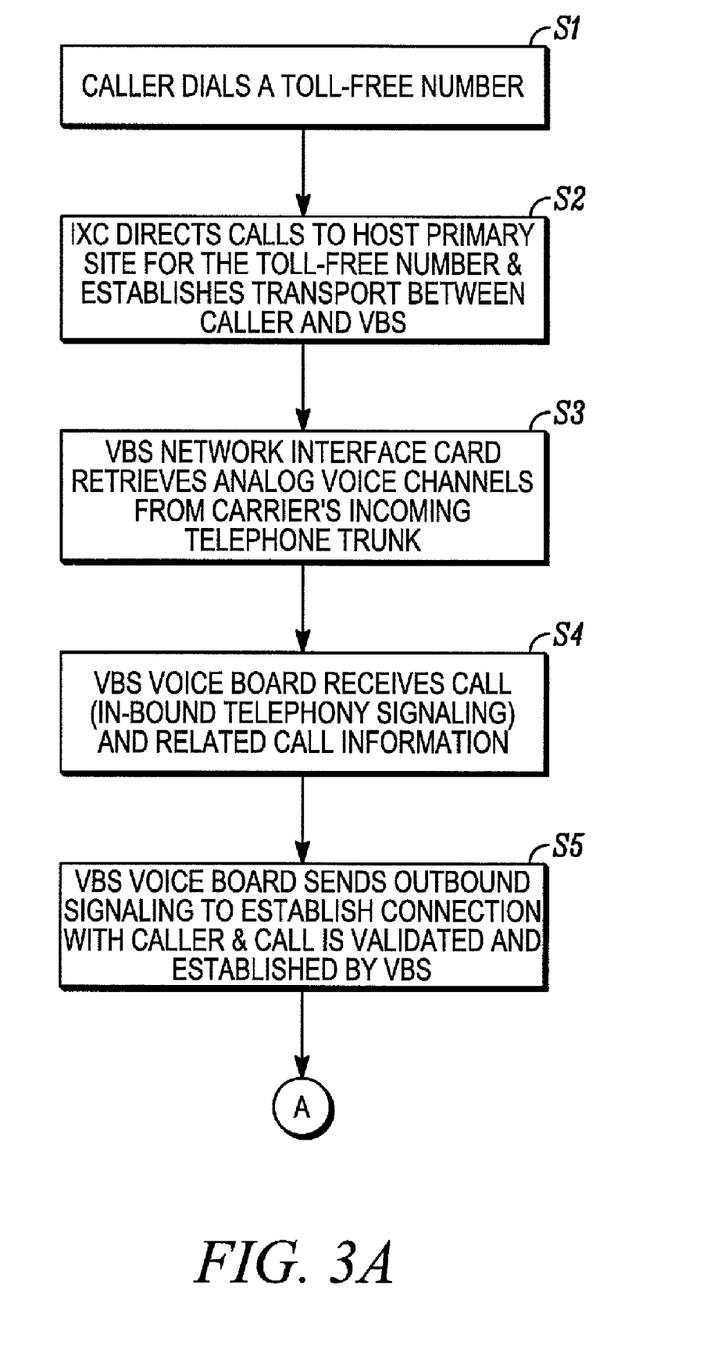
FIGS. 3A-C depict a call process flow as handled by an IVR-integrated host system in accordance with an embodiment of the present invention.
Figure 3B:
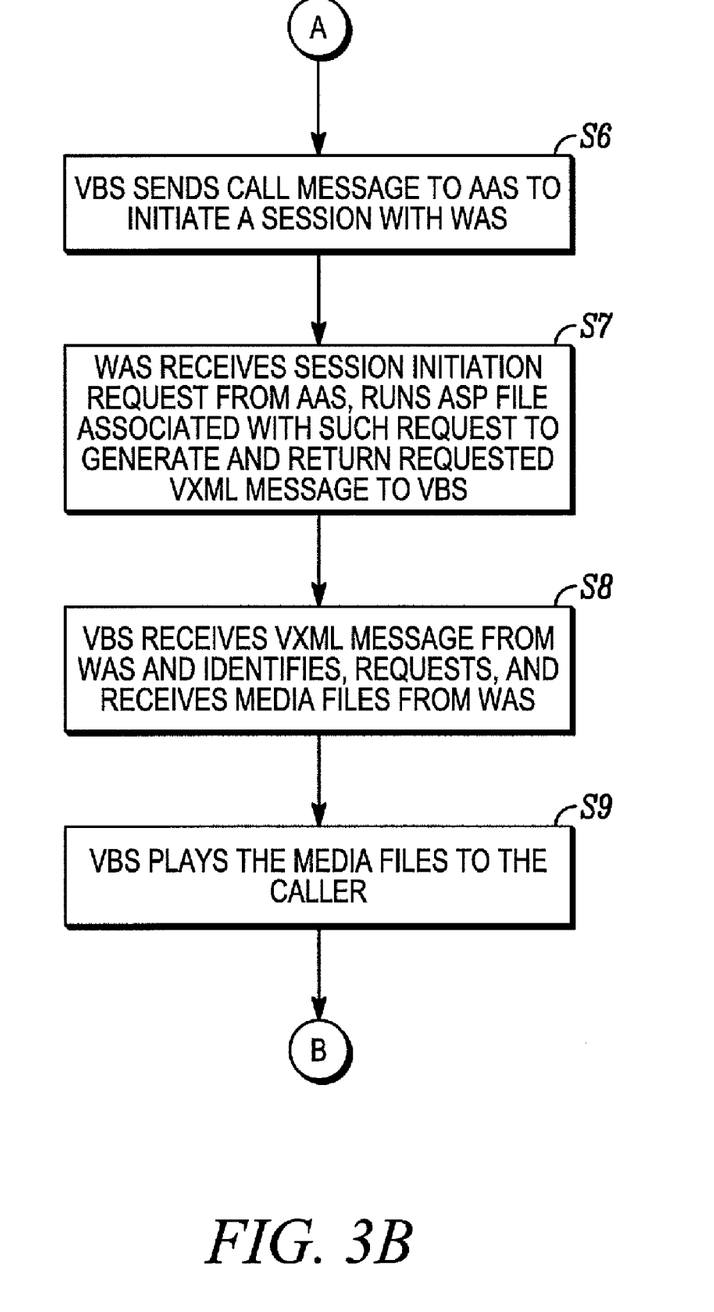
Figure 3C:
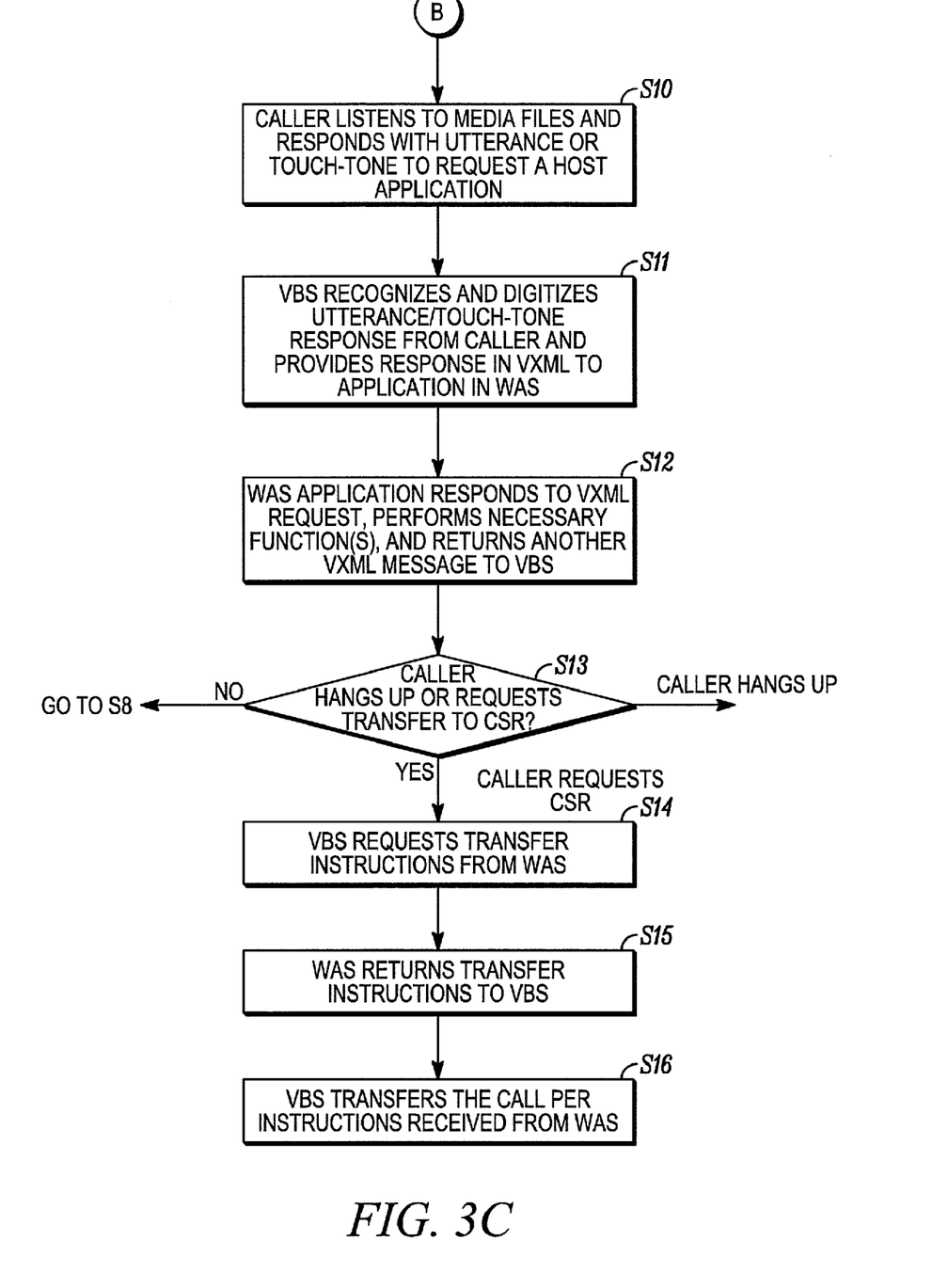

The WAS 101 may be connected to the IVR infrastructure 150 via a high speed communication network such as an Ethernet Local Area Network (LAN) 103 depicted in FIG. 2. According to an embodiment of the present invention, the IVR infrastructure 150 includes: a voice browser/telephony server (VBS) 151, a peripheral gateway (PG) server 152, a lightweight directory access protocol (LDAP) server 153, and an application administration server (AAS) 154. The functionality of each of these servers is described next with reference to a call flow process for accessing the host system 100 as shown in FIGS. 3A-C in accordance with an embodiment of the present invention.

At S1, a caller picks up the phone and dials a designated phone number (e.g., a toll-free number) to get connected to the host system.

At S2, a communication carrier designated by the host system, such as the IXC 10, routes the call and associated call information (e.g., ANI and DNI) to the primary site for the dialed phone number, such as the host system 100, in a manner known in the art via high-capacity telephone trunks such as T1 Primary Rate Interface (PRI) lines 140 to establish a communication transport between the caller and the VBS 151 in the integrated IVR environment 150. Hence, all incoming calls to the host system 100 are terminated at the VBS 151, which acts as a VRU and may include, among other components, network interface circuitry (e.g., network interface circuit card/board) and voice circuitry (e.g., Dialogic voice card/board). As mentioned earlier, the caller can be a customer of the host organization, such as a claimant, an insurer, or an insurance agent of a host insurance organization. The IXC 10 can be a long distance carrier such as AT&T, MCI Worldcom, Sprint, and Qwest.

At S3, the network interface card in the VBS 151 is used to establish the communication transport with the caller via the IXC 10 and, as understood in the art, may include circuitry to retrieve and transmit analog voice channels over the T1 lines 140, as routed by the IXC 10, using time division multiplexing (TDM). Alternatively, the network interface card may include voice-over-IP (VoIP) circuitry to retrieve and transmit analog voice channels over the T1 lines 140 using Internet Protocol (IP). The network interface card can also include circuitry that employs any other future communication technology, once such technology becomes available, to retrieve and transmit analog voice channels over future communication means using future communication protocols.

At S4, once a communication transport between the VBS 151 and the caller is established, the VBS 151 receives the call (i.e., inbound telephone signaling) and associated call information provided by the IXC 10 at the VBS voice board. The voice board is used for IVR, and it may include circuitry for DTMF detection and translation of signals from the received voice channels. Alternatively, a separate DTMF circuit board can be used for DTMF detection.

At S5, the VBS voice board then transmits outbound signaling to the IXC 10 to establish a connection with the caller. Hence, the VBS establishes the call and validates the call based on the received call information to indicate that a call has been initiated.

At S6, the VBS 151 sends a notification message to the AAS 154 to inform the latter of the call, wherein the AAS 154 initiates a communication session between the VBS 151 and the WAS 101. The AAS 154 serves as the overall controller for the integrated IVR environment 150. It keeps track of call information received from the IXC 10 and VBS 151 and applications provided by the WAS 101. It also manages the flow of information and applications between the VBS 151 and the WAS 101 to initiate and maintain sessions between these two servers.

At S7, the WAS 101 receives the session initiation request from the AAS 154, runs an Active Server Page (ASP) file associated with such request to generate and return the requested VXML message to the VBS 151. The session initiation request can be, for instance, a predetermined script identification (ID) that is associated with the DNI obtained from the call information. The script ID can contain a request for an initial voice message to be played for the caller over the phone (as routed by the IXC 10) and any other instructions on how to handle the call. This request is similar to a web browser's request for an Internet web page when a user enters a URL using web access, except a voice markup language document/page is requested rather than the usual hypertext markup language (HTML) document. The voice markup language can be the voice extended markup language (VXML) that is an extension or tagset of XML for voice segments, or any other voice markup language that is recognized by the VWM 154 and VWC server 151. For purposes of simplifying the description of the present invention, VXML will be used to generally denote a voice markup language. However, it should be noted that the choice to use a particular voice markup language merely depends on the desired design for the IVR environment, and the scope of the present invention is not limited to only voice extended markup language.

Hence, the WAS 101 can receive the session initiation request in the form of a script ID from the AAS 154 via the Ethernet LAN 103, and its ASP engine starts running an active server page (ASP) file corresponding to the received script ID, line by line, to execute the scripts in the file in order to dynamically generate the requested VXML document. The ASP engine in the WAS 101 returns the ASP file as the requested VXML document/message to the VBS 151 via the Ethernet LAN 103. Although ASP technology is used here as an example for dynamic generation of VXML documents, it should be understood that other current or future technologies can be applied to perform this function. The dynamic generation of VXML documents provides flexibility to the IVR environment 150 in its handling of multiple DNIs used by the callers to access the host system 100. For instance, the DNI may be for a claims department of a host insurance organization, such as Travelers, and the associated script ID's request is for an initial voice message string such as "Thank you for calling Travelers Claims Department" and an instruction such as "Please enter your claim number" in the form of media files to be played for the caller. On the other hand, if the caller dials a number for a rate quote department rather than a claims department, a correspondingly different script ID may call for a different VXML document, wherein the ASP engine can dynamically generate to provide a different voice message string such as "Thank you for calling Travelers Rate Quote Department" and other instructions to be played for the caller. The media files can be created, stored, and accessed as further described below.

At S8, the VBS 151 receives the VXML message from the WAS 101, identifies from the VXML message media files to be played to the caller, and requests and receives such files from the WAS 101.

At S9, the VBS 151 plays the media files to the caller through its voice board and network interface card, the T1 lines 140, and the IXC 10. The media files can be created and stored in the WAS 101 to provide audio segments to existing host applications in the WAS 101. They may be stored in digital code, which can be converted to analog audio signal by a Coder-Decoder (CODEC) in the voice board for playback to the caller.

At S10, the caller can interactively communicate with the WAS 101 by listening to the media files and responding with voice and/or touch-tone commands.

At S11, the VBS 151 receives the caller's response (voice and/or touch-tone) at its voice board, which recognizes and digitizes the response using its CODEC circuitry (for voice recognition) and/or DTMF circuitry (for touch-tone recognition). The VBS 151 then converts the digitized response into a VXML message that can be understood by the WAS 101. The VXML message is then forwarded to the WAS 101 to request access to a particular host application. For instance, the caller may have called in to a host insurance company to obtain an auto insurance rate quote from a rate quote application in the host WAS 101, wherein s/he may have been prompted by the host system 100, through its IVR environment 150, to initiate the auto insurance rate quote process by pressing the digit "1" on the phone keypad or saying "one" or "auto", etc. into the phone for auto quote (as opposed to another command for a home quote or a boat quote). The caller is now given voice access to an existing host application in the WAS 101 that pertains to an auto insurance rate quote process.

At S12, the WAS host application performs the necessary functions in response to the converted VXML request from the caller. Instead of returning a conventional web page with written text to the caller, the WAS host application returns a VXML document/message by using the aforementioned ASP engine to run an ASP file.

At S13, steps S8-S12 are then repeated until the caller hangs up (or ends the call with a designated command) or asks for a transfer to a CSR at a call center managed by the host system 100. If the caller hangs up, the IVR session is terminated.

At S14, if the caller asks for a transfer to a CSR, the VBS 151 would forward the transfer request to the AAS 154 to end the IVR conversation and to the WAS 101 to obtain transfer instructions.

At S15, the WAS 101 returns the transfer instructions to the VBS 151, which then transfers the call per the received instructions with the assistance of the PG server 152 at S16, as further described later.

The LDAP server 153 acts as a resource directory for the IVR environment 150 through the registration of all servers and any other resources available in the IVR environment 150 at the LDAP server 153. Resources used by the IVR environment 150 include, for example, the physical server locations for the addresses of all servers in the IVR environment 150, the number of ports each server has, and configuration information for the servers. Although FIG. 2 only shows an AAS 154, a PG server 152, and a VBS 151 for purposes of simplifying the description of the present invention, there can be multiples of such servers to accommodate any desired call handling capacity and/or host system needs. Thus, the LDAP server 153 is useful in keeping track of numerous resources in the IVR environment 150 and configuring the environment to accommodate the addition or removal of resources, even though it may not be directly involved in handling calls into the host system 100.

The PG server 152 acts as a communication interface between the IVR environment 150 and the rest of the host system 100 outside of the IVR environment 150. It does so by providing a communication interface between the intelligent call routing device 110 and VBS 151. The PG server 152 contains call routing functions for reading transfer information from the VBS 151 and forwarding route transfer requests from all incoming calls to the intelligent call routing device 100, such as an ICM, for distribution to the various call service centers managed by the host system 100. As mentioned above, this happens when the caller opts out of the IVR environment 150 and telephone automation provided by the WAS 101 for connection to a call service center maintained by the host organization. As shown in FIG. 2, the PG server 152 can forward route transfer requests to the ICM 110 via a LAN such as the Ethernets 103 and 104 and a call logger 111. The call logger 111 logs the incoming route requests, including the point of origin (i.e., ANI) of each call and any other choices selected by the caller into a format desired by the ICM 110.

Once the ICM 110 receives a route transfer request from the PG server 152, it reviews the nature of the incoming call against the real-time availability of the appropriate call service centers and their agents that can handle the incoming call. Based on the incoming call information as provided by the call logger 111, the ICM 110 also retrieves the relevant customer information from a host customer database 112. Each call service center has one or more automatic call distributors (ACDs), such as the ACD 131, which can switch calls arriving on incoming trunk lines as instructed by the ICM 110 to the telephone stations of individual CSRs. Additional peripheral gateways are maintained via hardware and/or software implementation, such as the PG servers 121 and 122, to enable the ICM 110 to receive information from the ACDs and monitor the status and availability of call service centers and CSRs managed by such ACDs. The status information is stored in a historical data server (HDS) 115, and it is available for real-time monitoring and historical reporting. The ICM 110 can tap into the HDS 115 to retrieve the status information in order to make optimal decisions regarding the routing of calls to the appropriate call service center and CSR. Hence, the HDS 115 can be used to manage the ICM 110. Based on the ACD status information from the HDS 115 and the relevant customer information retrieved from the customer database 111, the ICM 110 can route the incoming call to the best available call service center and agent to handle the caller.

According to one embodiment of the present invention, the call service centers can be connected to one another and to the rest of the host system 100 via communication networks such as a LAN 106 and a corporate LAN or wide area network (WAN) 107 in a manner understood in the art. Each call service center or field site can maintains an ACD reporting server 132 in a manner conventionally known in the art. The overall operation of the enterprise can be monitored and controlled from one or more administrative workstations 117 located throughout the system. With a single infrastructure, the enterprise contains the capability of managing all the capacity and applications in a single consistent manner with centralized control, which leads to lower support cost.

Because existing host applications such as those in the web application server 101 can be accessed by phone via the use of voice markup language documents, the applications are more portable without the need to modify them into specific and/or proprietary voice applications. Thus, application programmers can be mainstream programmers, such as web programmers, and they do not need to possess knowledge of specific and or proprietary software for developing voice applications from existing host applications. Additionally, host applications can be purchased on a concurrent port basis, and over-provisioning can be accomplished with standard inexpensive hardware and without incurring software costs. More fluidity between applications is possible, resulting in better utilization of resources, and new applications can be brought on-line easily. Another cost benefit to over-provisioning with the integrated IVR environment 150 of the present invention is the allowance of VRU ports at one or more VWC servers 151 to be provisioned to various host applications. Thus, the ports are resources that can be allocated to one or more host applications, and a separate port is no longer needed for each different host application.

Furthermore, because the IVR environment 150 is separate from the business logic and other host requirements residing in the web application server 101, it can be leveraged to support future technology without affecting the rest of the enterprise, and such business logic and other host requirements do not need to be rewritten to support any future modification to the IVR environment 150. Additionally, because the host organization supports and maintains the overall enterprise, it has increased control over strategic telephony technology decisions, and it can independently control most main aspects of network prompting and routing. Changing from one communication carrier to another is also simpler, and this leads to more leverage for the host organization in contract negotiations with the carriers.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

We claim:

1. A system for providing interactive voice response (IVR) capability together with a plurality of application systems comprising:
    a first primary application system at a first site and a redundant second application system at a geographically remote and distinct second site, wherein the first and second site are connected through at least one of a wide area network connection and a dedicated point to point link, for the exchange of data; and
    the first and second application systems, each comprising:
        a call router in communication with an interexchange carrier routing an incoming telephone call to the first application system or the second application system based on the real-time availability of IVR call handling resources within the first application system and the second application system, wherein during a failover situation, at least one subsequent incoming telephone call from the interexchange carrier is routed to the redundant second application system at the distinct second site, wherein the second site completes an IVR session with the subsequent incoming call from the interexchange carrier, and wherein both the first site and the second site utilize IVR applications and resources;
        an IVR environment comprising a plurality of IVR call handling resources, including at least a telephony server and a speech recognition system connected to the interexchange carrier through the telephony server, wherein the IVR environment receives an incoming telephone call and implements the IVR session using the IVR call handling resources within one of the first application system at the first site and the second application system at the second site to handle the incoming telephone call; and
        an auto call distribution server (ACD), wherein a request for a customer service agent is connected by the ACD to an agent based on real-time availability of the agents.

2. The system of claim 1, wherein the availability of resources is determined by the load on the first primary application system and the redundant second application system.

3. The system of claim 1, wherein the load on the redundant second application system is received through at least one of a wide area network connection and a dedicated point to point link.

4. The system of claim 1, wherein the call router sends an instruction to an interexchange carrier on where to route the incoming telephone call.

5. The system of claim 1, further comprising a database of customer information, wherein information about a customer corresponding to the incoming telephone call is provided to the agent by an intelligent call router.

6. The system of claim 1, wherein the at least one of the wide area network connection and the dedicated point to point link communicates the availability of the redundant second application system at the distinct second site to take an incoming telephone call.

7. The system of claim 1, wherein at least one of a wide area network connection and the dedicated point to point link is used to connect the first and second sites.

8. The system of claim 1, wherein the first and second application systems are at least one of service call handling, sales call handling, insurance, and agent call handling application systems.

9. The system of claim 8, wherein the insurance application system is an insurance claim processing application system.

10. A method for providing interactive voice response (IVR) capability together with a plurality of call routing application systems, comprising:
    providing an IVR environment comprising a plurality of IVR call handling resources, including at least a telephony server and a speech recognition server within a first call routing application system, and a second call routing application system that is independent and geographically remotely located from the first call routing application system;
    providing redundant functionality by the first call routing application system at a first site and the second call routing application system at a second site;
    connecting the first and second call routing application systems through at least one of a wide area network connection and a dedicated point-to-point link for the exchange of data;
    receiving a notification of an incoming telephone call into at least one of the first and second application systems;
    routing the incoming telephone call to the IVR environment of one of the first call routing application system and the second call routing application system to manage the incoming telephone call and implement the IVR session using the IVR call handling resources within one of the first application system and the second application system, wherein the incoming telephone call is routed to either the first call routing application system or the second call routing application system to avoid call congestion within the first site and the second site, wherein the routing of the incoming telephone call is based on the real-time availability of IVR call handling resources within the first site and the second site; and
    receiving the call by the IVR call handling resources within the one of the first call routing application system and the second call routing application system.

11. The method of claim 10, further comprising a dedicated point to point link for providing redundancy and communicating the availability of the second site to take an incoming telephone call.

12. The method of claim 10, wherein information relating to the real-time availability of the IVR call handling resources within the first site and the second site is exchanged using a private communication network, including the at least one of the wide area network connection and the dedicated point to point link.

13. The method of claim 10, wherein the first and second application systems are at least one of service call handling, sales call handling, insurance, and agent call handling application systems.

14. The method of claim 13, wherein the insurance application system is an insurance claim processing application system.

* * * * *